US012149090B2

(12) United States Patent
Podhola

(10) Patent No.: US 12,149,090 B2
(45) Date of Patent: Nov. 19, 2024

(54) OFFSHORE WIRELESS POWER TRANSFER SYSTEM

(71) Applicant: Kamil Podhola, Liberec (CZ)

(72) Inventor: Kamil Podhola, Liberec (CZ)

( * ) Notice: Subject to any disclaimer, the term of this patent is extended or adjusted under 35 U.S.C. 154(b) by 61 days.

(21) Appl. No.: 17/879,207

(22) Filed: Aug. 2, 2022

(65) Prior Publication Data

US 2024/0055866 A1    Feb. 15, 2024

(51) Int. Cl.
| | | |
|---|---|---|
| *H02J 3/38* | (2006.01) | |
| *B60L 5/00* | (2006.01) | |
| *B60L 8/00* | (2006.01) | |
| *B60L 9/00* | (2019.01) | |
| *B63B 35/44* | (2006.01) | |
| *H02J 50/05* | (2016.01) | |
| *H02J 50/10* | (2016.01) | |

(52) U.S. Cl.
CPC .............. *H02J 3/381* (2013.01); *B60L 5/005* (2013.01); *B60L 8/003* (2013.01); *B60L 8/006* (2013.01); *B60L 9/00* (2013.01); *B63B 35/44* (2013.01); *H02J 50/05* (2016.02); *H02J 50/10* (2016.02); *B63B 2035/4453* (2013.01); *B63B 2035/446* (2013.01); *B63B 2035/4466* (2013.01); *H02J 2300/24* (2020.01); *H02J 2300/28* (2020.01); *H02J 2300/30* (2020.01); *H02J 2310/42* (2020.01)

(58) Field of Classification Search
CPC ... H02J 3/38; H02J 3/381; B60L 5/005; B60L 8/003; B60L 8/006; B60L 9/00; B60L 5/00; B60L 8/00; B63B 35/44; B63B 2035/4453; B63B 2035/446; B63B 2035/4466
See application file for complete search history.

(56) References Cited

U.S. PATENT DOCUMENTS

| | | | |
|---|---|---|---|
| 2012/0242159 A1* | 9/2012 | Lou .......................... | H03H 7/40 307/104 |
| 2022/0239151 A1* | 7/2022 | Mikalsen .............. | B60L 53/305 |
| 2023/0378824 A1* | 11/2023 | Palombini ............... | G06F 21/31 |

* cited by examiner

*Primary Examiner* — Robert L Deberadinis

(57) ABSTRACT

The invention relates to an offshore wireless power transfer system for water vessels at least partially electrically driven comprising a primary interface coupled with a power source and a secondary interface coupled with the water vessel, the interfaces providing unidirectional or bidirectional power transfer which can be inductive, capacitive, and/or magnetodynamic. The primary interface can have connected power transfer sections which can be switchable. Inductive system can include inductive loops, capacitive system can include capacitive plates and magnetodynamic can include magnetic elements and loops. The system can be thermally managed. The interfaces can be buoyant or nonbuoyant, level adjustable. The power transfer can take place at about/under/above water level. The secondary interface can be mobile or coupled with a mobile device. The interfaces can include electrocomponents. The system can provide data transmissions, and be provided in a cloud-based communication system, a hydrogen powering system and a modular system.

15 Claims, 4 Drawing Sheets

OFFSHORE WIRELESS POWER TRANSFER SYSTEM

This application claims the benefit and priority of International Application No. PCT/IB2021/050162, filed 11 Jan. 2021 and is hereby incorporated by reference in its entirety.

TECHNICAL FIELD

The invention relates to an offshore wireless static/dynamic power transfer system for water vessels at least partially electrically driven.

BACKGROUND ART

There is a wide range of water vessels at least partially electrically driven which are gaining popularity and are becoming more available for a wider range of consumers. They may comprise a rechargeable power source. They may have an improved ecological impact and may be a sustainable form of marine transportation. Many people and companies are attracted to them because they want to decrease their personal impact on the environment through transport.

US 2014/232200 A1 (MAEKAWA YUJI [JP]) 21 Aug. 2014 (hereinafter "MAEKAWA") discloses a power transmission system transmitting power underwater between a power-transmitting device and a power-receiving device of which at least one is capable of moving freely underwater. In this power transmission system, the power-transmitting device and the power-receiving device are each provided with a resonance coil that performs the power transmission wirelessly underwater by means of magnetic field resonance. At least one of the power-transmitting device and the power-receiving device is provided with a balloon that internally houses the resonance coil of its own device.

The document fails to disclose an offshore wireless power transfer system for overwater wessels wherein a power transfer takes place at about a water level, fails to disclose a wireless power transfer system in a splash, temporary water contact, fails to disclose the power transfer system wherein a power-transmitting device include one or more power transfer sections and one or more connections in the sense of the terms used in the present invention, fails to disclose an offshore wireless power transfer system using capacitive power transfer and/or magnetodynamic power transfer in an offshore environment.

RU 2 735 796 C1 (FEDERALNOE GOSUDARSTVENNOE BYUDZHETNOE OBRAZOVATELNOE UCHREZHDENIE VYS) 9 Nov. 2020 discloses ropeways, and can be used for delivery of cargoes to coastal settlements of Arctic coast of the Russian Federation. Proposed device comprises ropeway formed by multiple interconnected drive sections with three-phase synchronous geared motors and adapted for underwater use.

The document fails to disclose a wireless system with features as described ad MAEKAWA.

CN 111 162 611 A (HARBIN INST OF TECH WEIHAI; SHANDONG SHIP TECH RESEARCH INSTITUTE) 15 May 2020 discloses a wireless electric energy transmission device based on electric field coupling, a control method and an unmanned ship charging system. The wireless electric energy transmission device comprises an electric energy transmitting part and an electric energy receiving part which are arranged independently. The electric energy transmitting part comprises a first sub-branch and a second sub-branch; one end of the first sub-branch is an electric energy input positive electrode end; a first polar plate is arranged at other end, one end of the second sub-branch is an electric energy input negative electrode end, the other end is provided with a first conductive terminal, the electric energy receiving part comprises a third sub-branch and a fourth sub-branch, one end of the third sub-branch is an electric energy output positive electrode end, the other end is provided with a second polar plate, one end of the fourth sub-branch is an electric energy output negative electrode end, and the other end is provided with a second conductive terminal. The positive electrode and the negative electrode of the power supply do not need to be exposed at the same time, so that the problems of short circuit and electric spark are solved, few components are needed, the system structure is simple, a resonance compensation circuit is not needed, and the detuning problem caused by the resonance compensation circuit is solved.

The document fails to disclose a system with features as described ad MAEKAWA.

US 2015/002092 A1 (NIIZUMA MOTONAO [JP]) 1 Jan. 2015 discloses an underwater power supply system provided with an ascending/descending station that ascends and descends underwater between the water depth at which an underwater moving body works and the vicinity of the water surface, and a charging station that supplies electrical power wirelessly to the ascending/descending station in the vicinity of the water surface. At the aforementioned water depth, the underwater moving body moves adjacent to the ascending/descending station, and electrical power is supplied wirelessly from the ascending/descending station to the underwater moving body.

The document fails to disclose a system with features as described ad MAEKAWA.

DISCLOSURE OF INVENTION

The aforementioned deficiencies are therefore solved by the features of claim 1. In the dependent claims advantageous developments of the offshore wireless power transfer system according to the invention are given.

It is therefore the object of the present invention to propose an offshore wireless power transfer system (OPTS) for water vessels at least partially electrically driven comprising a primary interface coupled with a power source and a secondary interface coupled with the water vessel, wherein the primary interface includes one or more power transfer sections and one or more in the present invention defined connections.

A further object is to propose the OPTS with defined wireless power transfer systems.

A further object is to propose the OPTS with switchable power transfer sections.

A further object is to propose the OPTS with primary and secondary (resonant) inductive interfaces including respective inductive loops.

A further object is to propose the OPTS with primary and secondary (resonant) capacitive interfaces including respective capacitive plates.

A further object is to propose the OPTS with primary and secondary magnetodynamic interfaces including respective inductive loops and magnetic elements.

A further object is to propose the OPTS with a thermal management system.

A further object is to propose the OPTS with buoyant or nonbuoyant primary and/or secondary power transfer interfaces.

A further object is to propose the OPTS, with level adjustable primary and/or secondary power transfer interfaces.

A further object is to propose the OPTS with the secondary interface mobile and/or coupled with a mobile device.

A further object is to propose the OPTS including or coupled with a defined electrocomponent.

A further object is to propose the OPTS providing defined data transmissions.

A further object is to propose the OPTS in a cloud-based communication system.

A further object is to propose the OPTS in a hydrogen powering system.

A further object is to propose the OPTS in a modular system.

Other and further objects will be explained hereinafter and will be particularly pointed out in the appended claims.

In a first aspect, the invention discloses an offshore wireless power transfer system for a water vessel at least partially electrically driven.

BRIEF DESCRIPTION OF DRAWINGS

The invention will now be described by way of example. Only essential elements of the invention are schematically shown and not to scale to facilitate immediate understanding, emphasis being placed upon illustrating the principles of the invention.

BEST MODE FOR CARRYING OUT THE INVENTION

Figure 1:
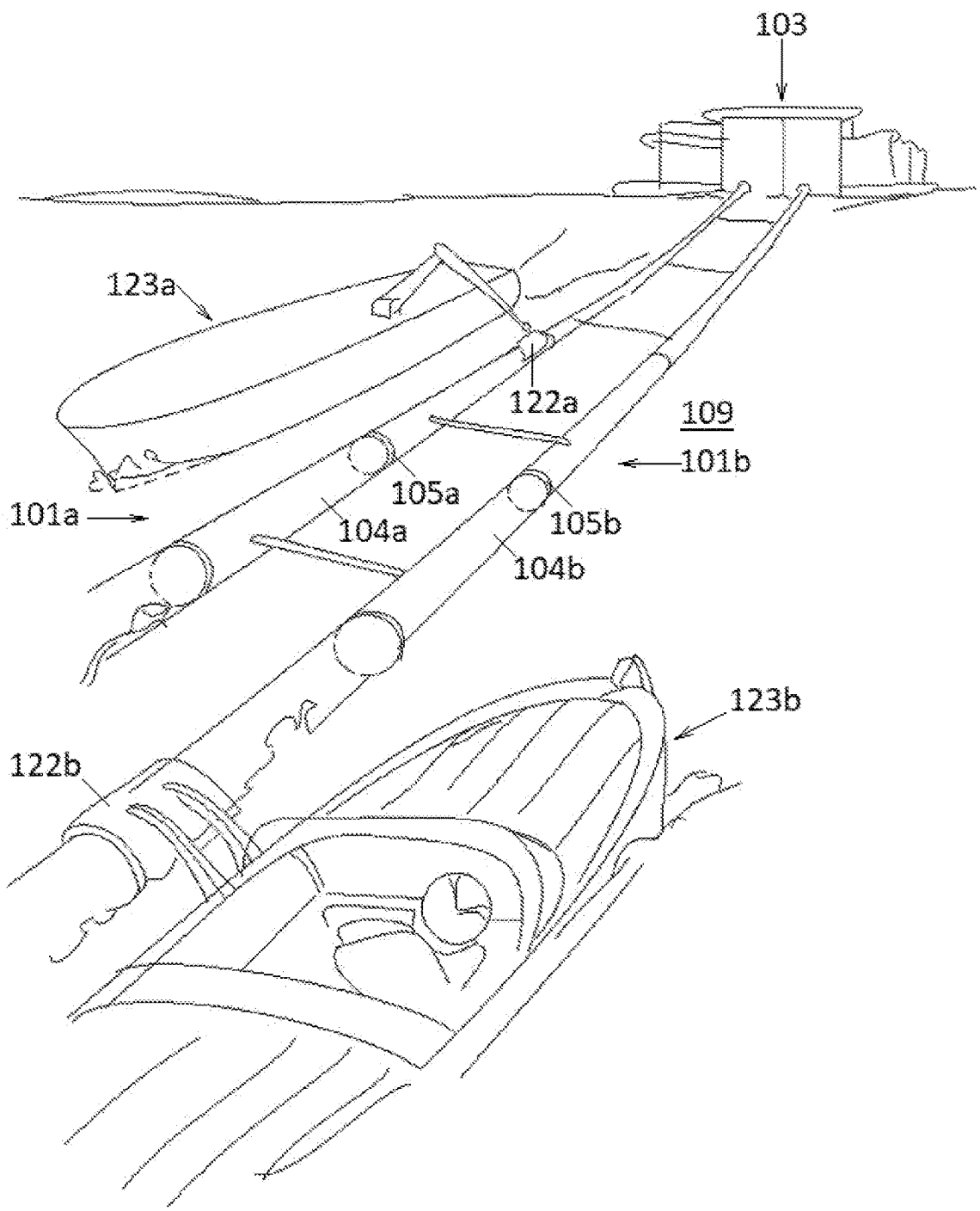
FIG. 1 is a perspective view of an offshore wireless power transfer system with primary buoyant interfaces coupled with an onshore power source and secondary interfaces coupled with water vessels at least partially electrically driven. The primary interfaces can include power transfer sections with connections.

The following detailed description shows the best contemplated modes of exemplary embodiments. The description is made for the purpose of illustrating the general principles of the invention, and in such a detail that a skilled person in the art can recognise the advantages of the invention, and can be able to make and use the invention. The detailed description is not intended to limit the principle of the presented invention, but only to show the possibilities of it.

The terms used in the claims and the specifications shall refer to their synonyms as well (e.g. support, hold, bear, carry, couple, etc.).

As used in the claims and the specification, the term "water vessel at least partially electrically driven" shall refer to manned and unmanned water vessels, and shall refer to overwater and underwater water vessels, and shall refer to toys and models and the like as well.

As used in the claims and the specification, the terms "onshore power source", "offshore power source" shall refer to power transmission systems, power distribution systems and shall refer to mobile systems and shall refer to "power grid" and the like as well.

As used in the claims and the specification, the term "motor generator" shall preferably not exclusively refer to electric energy generating systems using an electrical generator coupled with an engine (which can be a jet engine, an engine burning a hydrocarbon fuel, a gas generator, a turbine, etc.) and shall also refer to the term "power plant", and the like, and shall also refer to mobile units, compact units, enclosed units, portable units, skid mounted units and shall also refer to thermal electric types and atomic types and shall also refer to floating and underwater types and shall also refer to power plants, power units comprising exhaust products (e.g. gases, fluids) treatments.

The term "inductive" shall also refer to resonant inductive, the term "capacitive" shall also refer to resonant capacitive.

The term "magnetodynamic" shall preferably not exclusively refer to magneto-mechanical systems using translational and/or rotational motion of a magnetic element or arrays of magnetic elements to wirelessly transfer power.

As used in the claims and the specification, the term "switchable" shall refer to "partially switchable", "selectively switchable", "temporarily switchable", and the like as well.

As used in the claims and the specification, the term "capacitive plate" shall refer to any form and shape of a conductive electrode.

As used in the claims and the specification, the term "buoyant" shall refer to active and/or passive buoyancy control systems in various possible configurations (e.g. built-in, attached, detachably attached, etc.) and/or to active buoyancy control systems wherein flotation may be obtained by various active devices (variable ballast tanks, compressed air, propellers, jets, etc.). Buoyant systems may use static anchoring (e.g. with anchoring lines), dynamic anchoring, or combinations thereof, (the same applies to mooring, tethering, etc.).

As used in the claims and the specification, the term "bottom rest supporting construction" shall preferably not exclusively refer to a bottom rest supporting construction, wherein at least one said bottom rest supporting construction is selected from the group consisting of fixed constructions, compliant constructions, or combinations thereof.

As used in the claims and the specification, the term "water vessel supporting construction" shall preferably not exclusively refer to mechanical, hydraulic, electromagnetic, pneumatic supporting constructions, and shall refer to constructions powered manually, electrically, hydraulically, pneumatically, and shall refer to constructions powered by natural forces, e.g. buoyant force, etc., and shall refer to constructions controlled manually, computer controlled, etc., and shall refer to drones, remotely operated vehicles and the like as well.

As used in the claims and the specification, the term "level" as in "level adjustable", shall preferably not exclusively refer to a level wherein at least one said level is selected from the group consisting of levels situated between above water level and a water bottom, or combinations thereof.

As used in the claims and the specification, the term "level adjustable", shall preferably not exclusively refer to mechanical (e.g. sliding constructions, slack-line configurations), hydraulic, electromagnetic, pneumatic constructions, and shall refer to constructions powered manually, electrically, hydraulically, pneumatically, and shall refer to constructions powered by natural forces, e.g. buoyant force, gravitation force, etc., and shall refer to constructions controlled manually, computer controlled, remote controlled, natural phenomena controlled (e.g. controlled by tides), etc.

As used in the claims and the specification, the term "rechargeable power source" shall refer to rechargeable batteries, capacitors, hybrid sources, energy storage elements, and the like.

As used in the claims and the specification, the term "at least one of A and B" shall refer to at least A, or at least B, or both.

As used in the claims and the specification, the singular forms are intended to include the plural forms as well.

The term "to couple" and derivatives shall refer to a direct or indirect connection via another device and/or connection.

The terms "to comprise", "to include", "to contain" and derivatives specify the presence of an element, but do not preclude the presence or addition of one or more other elements or groups and combinations thereof.

The term "consisting of" characterises a Markush group which is by nature closed. Single members of the group are alternatively useable for the purpose of the invention. Therefore, a singular if used in the Markush group would indicate only one member of the group to be used. For that reason are the countable members listed in the plural. That means together with qualifying language after the group "or combinations thereof" that only one member of the Markush group can be chosen or any combination of the listed members in any numbers. In other words, although elements in the Markush groups may be described in the plural, the singular is contemplated as well. Furthermore, the phrase "at least one" preceding the Markush groups is to be interpreted that the group does not exclude one or more additional elements preceded by the phrase.

The invention will be described in reference to the accompanying drawings.

FIG. 1 is a perspective view of an offshore wireless power transfer system with primary buoyant interfaces (101$a$, 101$b$) coupled with an onshore power source (103) and secondary interfaces (122$a$, 122$b$) coupled with water vessels at least partially electrically driven (123$a$, 123$b$). The primary interfaces (101$a$, 101$b$) can include power transfer sections (104$a$, 104$b$) with connections (105$a$, 105$b$).

The onshore power source (103) can be an onshore power grid. The power transfer can be unidirectional and/or bidirectional and can take place at about water level in offshore water (109). The power transfer sections (104$a$, 104$b$) can be switchable to follow the movement of the water vessels (123$a$, 123$b$) which can include rechargeable power sources (not shown) [which can be any type of rechargeable power source using electric energy to be recharged, e.g. a bank of rechargeable batteries, capacitors, a compressed air production unit with a compressor and a compressed air storage tank, a hydrogen fuel production unit with an electrolyser, hydrogen fuel storage tank, fuel cell and an electric motor; the rechargeable power source can be a hybrid source]. The connections (104a, 104b) can be any type of permanent or detachable mechanical, hydraulic, electromagnetic, power, electrical, electronic, nonflexible or flexible connections which can follow wave movements.

Figure 2:
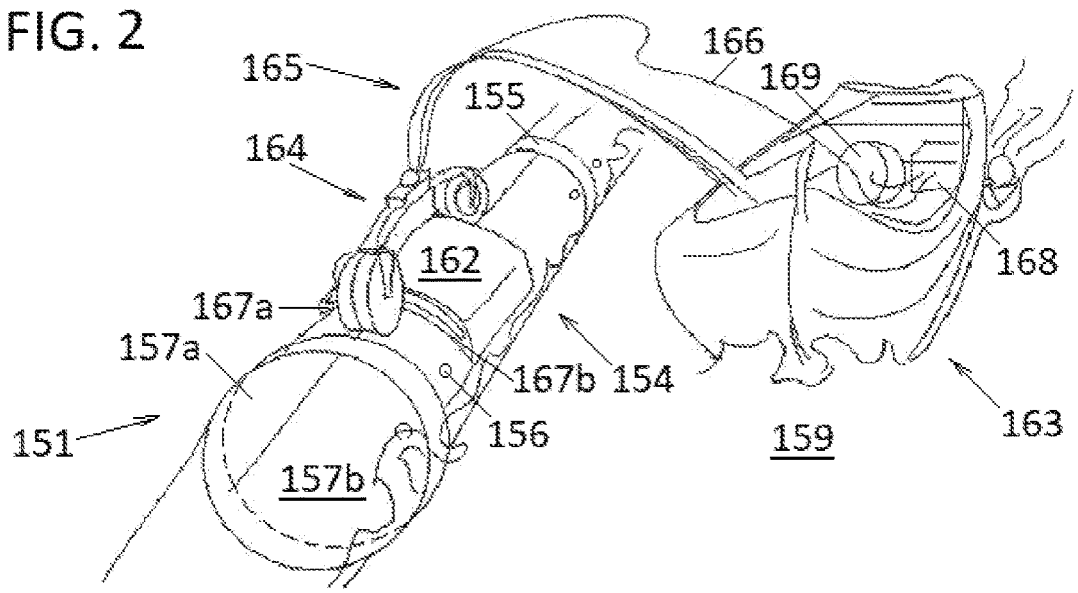
FIG. 2 is a perspective view of an offshore wireless power transfer system with a buoyant primary capacitive interface and a secondary capacitive interface coupled with a mobile device and with a water vessel at least partially electrically driven. The primary interface can include power transfer sections with connections, and electrocomponents.

FIG. 2 is a schematic perspective view of an offshore wireless power transfer system with a buoyant primary capacitive interface (151) and a secondary capacitive interface (162) coupled with a mobile device (164) and with a water vessel at least partially electrically driven (163). The primary capacitive interface (151) can include pairs of primary capacitive plates (157a, 157b) which can be provided in a watertight installation at about a perimeter of the primary interface (151) and which can be conveniently shaped and fabricated from any convenient material [e.g. metallic (aluminium) plates]. The primary interface (151) can include convenient power and communication components and can include power transfer sections (154) with connections (155), and electrocomponents (156).

The power transfer can be unidirectional and/or bidirectional and can take place at about water level in offshore water (159). The power transfer sections (154) can be switchable to follow the movement of the water vessel (163). The connections (155) can be any type of connecting constructions. The electrocomponents (156) can be sensors coupled with sensing units which can be coupled with a switching unit to switch the power transfer sections (154). The sensors can be acoustical, optical, electromagnetic and can sense a position of the secondary capacitive interface (162) to appropriately switch adjacent power transfer sections (154). The mobile device (164) can be any type of rolling, sliding, electromagnetic device enabling movement.

The secondary capacitive interface (162) can be nonbuoyant, can include pairs of secondary capacitive plates (167a, 167b) which can be provided in a watertight installation and conveniently shaped to match the primary capacitive interface (151) and fabricated from any convenient material [e.g. metallic (aluminium) plates]. The secondary capacitive interface (162) can include convenient power and communication components and can be level adjustably coupled to the water vessel (163) to be able to couple, discouple, follow a wavy movement of the primary capacitive interface (151) which can take place while the water vessel (163) be stationary and/or in a motion.

The secondary capacitive interface (162) can be supported by any type of a water vessel supporting construction (165) [which can be a mechanical, electromagnetic, hydraulic construction, and which can range from a towing rope up to a robotical arm to manipulate the secondary interface]. The supporting construction (165) can be operated by the water vessel (163) and/or by an operator of the power transfer system and/or of a cloud (see FIG. 17). The secondary capacitive interface (162) can include corresponding electrocomponents to the primary capacitive interface [e.g. sensors, targets, sensing units, actuators, processors, power and communication components]. The secondary interface (162) can be coupled with the water vessel (163) by a conductor (166) [which can be a marine power cable] which can be coupled with a source management system (168) coupled with an electric motor (169).

Figure 3:
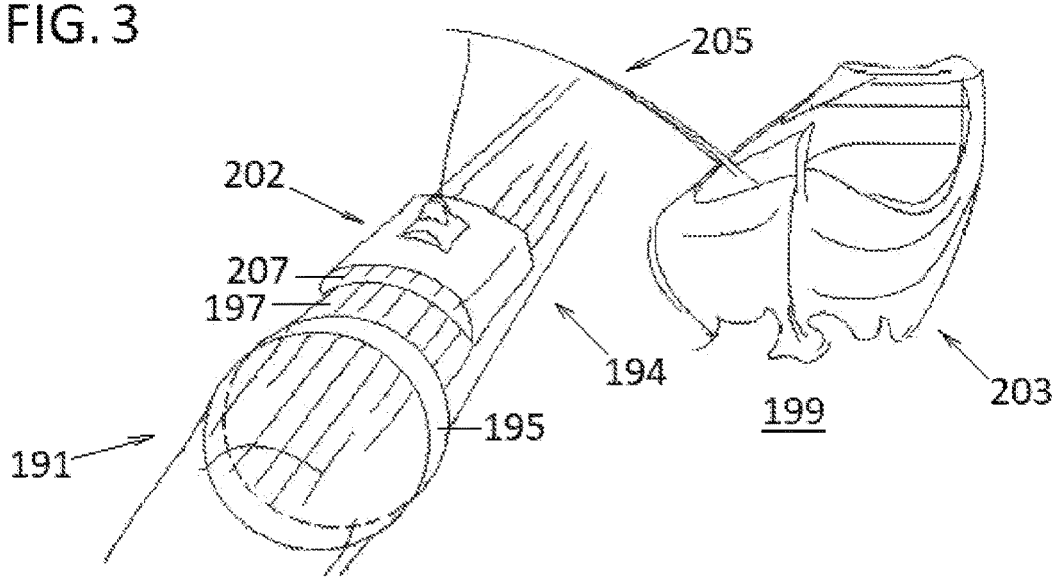
FIG. 3 is a schematic perspective view of an offshore wireless power transfer system with a buoyant primary inductive interface and a mobile secondary inductive interface coupled with a water vessel at least partially electrically driven. The primary interface can include power transfer sections with connections.

FIG. 3 is a schematic perspective view of an offshore wireless power transfer system with a buoyant primary inductive interface (191) and a mobile secondary inductive interface (202) coupled with a water vessel at least partially electrically driven (203). The primary inductive interface (191) can include primary inductive loops (197) which can be provided in a watertight installation at about a perimeter of the primary interface (191) and which can be conveniently shaped and fabricated from any convenient material [e.g. litz wire, with ferrite cores and/or backing plates, metallic (e.g. aluminium) shielding plates to conveniently shield, guide and orient a magnetic flux]. The primary interface (191) can include convenient power and communication components and can include power transfer sections (194) with connections (195), and electrocomponents (not shown).

The power transfer can be unidirectional and/or bidirectional, can be accompanied with data transmissions concerning power transfer parameters and can take place at about water level in offshore water (199). The secondary interface (202) can be mobile [e.g. can slide, roll] to enable dynamic charging. The secondary interface (202) can be buoyant [e.g. can comprise a floater (not shown)], can include secondary inductive loops (207) which can be provided in a watertight installation and conveniently shaped to match the primary inductive interface (191) and fabricated from any convenient material [e.g. similarly as the primary interface (191)]. The secondary inductive interface (202) can include convenient power and communication components, can be level adjustably coupled to the water vessel (203) and supported by any type of a water vessel supporting construction (205) [e.g. a multifunctional towing rope comprising a power cable and supported by a mechanical construction].

Figure 4:
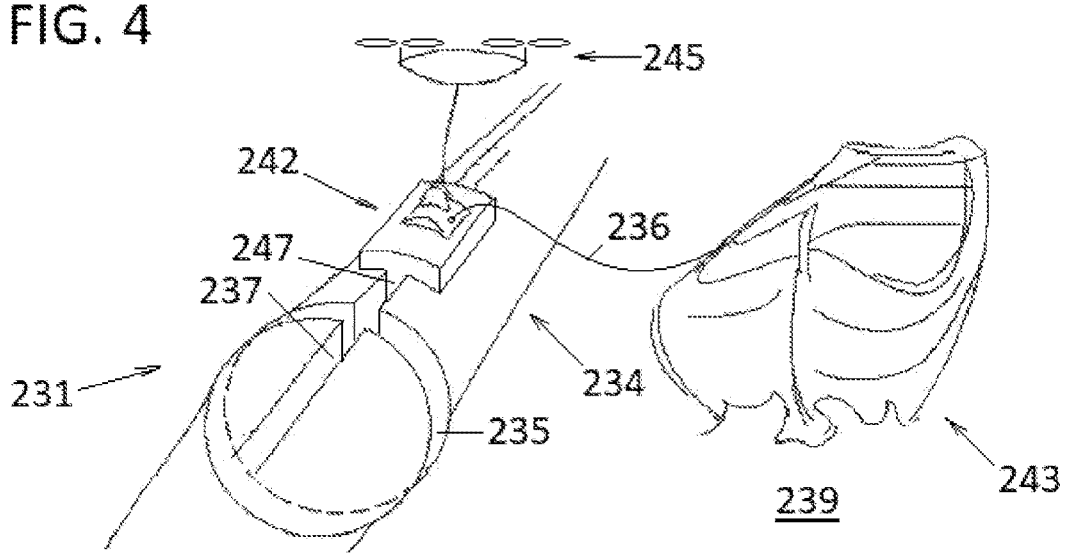
FIG. 4 is a schematic perspective view of an offshore wireless power transfer system with a buoyant primary magnetodynamic interface and a mobile secondary magnetodynamic interface coupled with a water vessel at least partially electrically driven. The primary interface can include power transfer sections with connections.

FIG. 4 is a schematic perspective view of an offshore wireless power transfer system with a buoyant primary magnetodynamic interface (231) and a mobile secondary magnetodynamic interface (242) coupled with a water vessel at least partially electrically driven (243). The primary interface (231) can include transmitting loops (not shown) [which can be separately switchable] which can be provided in a watertight installation at about a slot (237) of the primary interface (231) [the loops can be fabricated from any convenient material (e.g. similarly as shown in FIG. 3)]. The primary interface (231) can include convenient power and communication components and can include power transfer sections (234) with connections (235), and electrocomponents (not shown).

The power transfer can be unidirectional and/or bidirectional, can be accompanied with data transmissions concerning power transfer parameters and can take place at about water level in offshore water (239). The secondary interface (242) can be mobile [e.g. can slide, roll] to enable dynamic charging. The secondary interface (242) can be buoyant [e.g. can comprise a floater (not shown) and can include receiving loops, piezoelectric transducers, electrostatic transducers] can be provided in a watertight casing (247) shaped to match the slot (237) in the primary inductive interface (231) so that the primary loops can magnetically act upon magnetic elements [which can be from ferromagnetic material] to transfer power into the receiving loops [and/or the piezoelectric transducers, the electrostatic transducers] which can be comprised in the secondary magnetodynamic interface (242) (not shown). The receiving loops can be fabricated from any convenient material [e.g. similarly as the transmitting loops]. The secondary electromagnetic interface (242) can include convenient power and communication components, can be level adjustably coupled to the water vessel (243) and supported by any type of a water vessel supporting construction (245) [which can be any type of a drone navigated from the water vessel (243)]. The secondary interface (242) can be coupled with the water vessel by a conductor (236).

Common features of FIGS. 1 to 4

Primary inductive loops, primary capacitive plates and/or transmitting loops in primary magnetodynamic interfaces can be provided in waterproof/watertight installations at about a perimeter of respective primary interfaces and can be conveniently shaped (e.g. round sectional shaped as shown in FIGS. 1 to 3, but any other sectional shape/e.g. squared, oval/is possible) and/or can be provided in a slot-type installation (as shown in FIG. 4) and/or inversely in a rail-type installation with one or more slots/rails in various positions about the primary interfaces.

Primary and secondary inductive loops, primary and secondary capacitive plates and transmitting and receiving loops and magnetic elements in magnetodynamic interfaces may be provided in a simple type primary and secondary interfaces (as shown in FIGS. 1 to 4) or in multiple type primary and secondary interfaces which can be an interface with a plurality of parallel sections containing inductive loops/capacitive plates, etc. wherein the sections can have different sectional shapes, or it can be an interface with multislot- or multirail-type installation, or it can be an interface with separate parallel sections interconnected at specific distances wherein the sections can contain the inductive loops/capacitive plates, etc. and the interconnections can be used to contain transversal portions of an inductive loop. Numbers of sections in primary and secondary interfaces does not need to be the same, e.g. one type of interfaces can have odd numbers of sections and a corresponding other type of interfaces can have even numbers of sections. Such multiple sections can be separately switchable, e.g. to follow a movement of a coupled water vessel to transfer power.

Each type of secondary interfaces (inductive, capacitive, magnetodynamic) can be arranged to be at least partially rotational. Such a rotational interface can include rotational parts of different shapes (e.g. disc shaped, cylinder shaped) and numbers. The rotational interface can similarly be of simple or multiple types with one or more rotational parts which can contain secondary inductive loops, secondary capacitive plates and/or receiving loops and/or magnetic elements.

Primary wireless and secondary wireless interfaces of each type (inductive, capacitive, magnetodynamic) can be arranged to be combined interfaces [e.g. inductive/capacitive, etc.] and can be provided in various non-resonant/resonant compensation circuit topologies [which can include inductors, capacitors, resistors, diodes, switches, etc.] including topologies for the combined interfaces.

Figure 5:
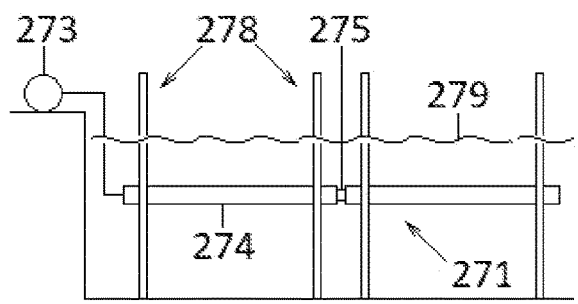
FIG. 5 is a schematic side view of a level adjustable offshore wireless power transfer system with a primary interface coupled with an onshore power source wherein power transfer can take place at about/under/above water level. The primary interface can be nonbuoyant, can include power transfer sections and connections and can be adjustably supported by bottom rest supporting constructions.

FIG. 5 is a schematic side view of a level adjustable offshore wireless power transfer system with a primary interface (271) coupled with an onshore power source (273) wherein power transfer can take place at about/under/above water level (279). The primary interface (271) can be nonbuoyant, can include power transfer sections (274) and connections (275) and can be adjustably supported by bottom rest supporting constructions (278) [which can be any type of a supporting construction enabling level adjustability; it can include mechanical, pneumatical, electromagnetic, hydraulic level adjusting mechanism which can draw power from the same power source (273), can be controlled from the same control centrum as the primary interface (271)].

Figure 6:
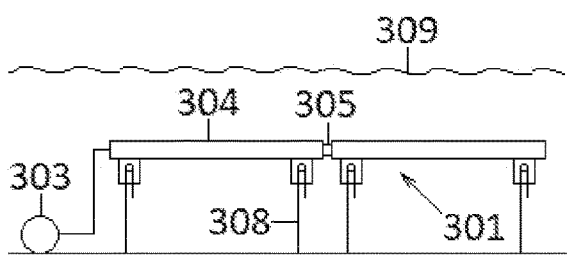
FIG. 6 is a schematic side view of another embodiment of a level adjustable offshore wireless power transfer system with a primary interface coupled with an offshore power source wherein power transfer can take place at about water level and/or under water level. The primary interface can be buoyant anchored with adjustable anchoring lines and can include power transfer sections and connections.

FIG. 6 is a schematic side view of another embodiment of a level adjustable offshore wireless power transfer system with a primary interface (301) coupled with an offshore power source (303) wherein power transfer can take place at about water level and/or under water level (309). The primary interface can be buoyant anchored with adjustable anchoring lines (308) and can include power transfer sections (304) and connections (305).

Figure 7:
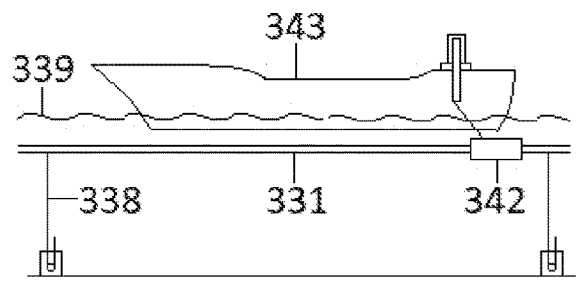
FIG. 7 is a schematic side view of another embodiment of a level adjustable offshore wireless power transfer system with a secondary interface coupled with a water vessel at least partially electrically driven wherein power transfer can take place at about and/or under water level. The primary interface can be buoyant anchored with adjustable anchoring lines and can include power transfer sections and connections.

FIG. 7 is a schematic side view of another embodiment of a level adjustable offshore wireless power transfer system with a secondary interface (342) coupled with a water vessel at least partially electrically driven (343) wherein power transfer can take place at about and/or under water level (339). The primary interface (331) can be buoyant anchored with adjustable anchoring lines (338) and can include power transfer sections with connections (not shown) [e.g. flexible mechanical connections, power connections, electrical connections, electronic connections, etc.].

Figure 8:
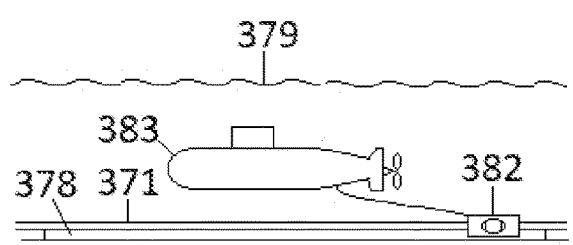
FIG. 8 is a schematic side view of another embodiment of an offshore wireless power transfer system with a secondary interface coupled with a water vessel at least partially electrically driven wherein power transfer can take place under water level. The primary interface can be nonbuoyant anchored with an adjustable bottom rest supporting construction and can include power transfer sections and connections.

FIG. 8 is a schematic side view of another embodiment of an offshore wireless power transfer system with a secondary interface (382) coupled with a water vessel at least partially electrically driven (383) wherein power transfer can take place under water level (379). The primary interface (371) can be nonbuoyant anchored with an adjustable bottom rest supporting construction (378) [which can be any type of mechanical, pneumatic, hydraulic, electromagnetic supporting construction] and can include power transfer sections with connections (not shown) [e.g. nonflexible mechanical connections, power connections, electrical connections, electronic connections, etc.].

Figure 9:
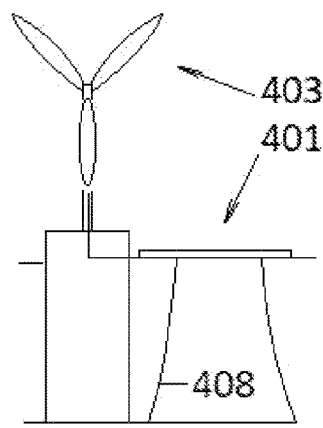
FIG. 9 is a schematic side view of an offshore wireless power transfer system with a primary interface coupled with an offshore wind energy to electric energy converter. The primary interface can be buoyant anchored with anchoring lines and can include power transfer sections and connections.

FIG. 9 is a schematic side view of an offshore wireless power transfer system with a primary interface (401) coupled with an offshore wind energy to electric energy converter (403). The primary interface (401) can be buoyant anchored with anchoring lines (408) and can include power transfer sections with connections (not shown) [e.g. flexible mechanical connections to cope with waves, tidal changes, water currents, etc.].

Figure 10:
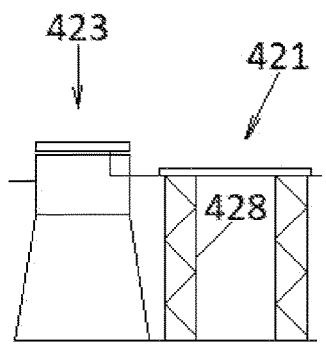
FIG. 10 is a schematic side view of an offshore wireless power transfer system with a primary interface coupled with an offshore solar energy to electric energy converter. The primary interface can be nonbuoyant supported by a bottom rest supporting construction and can include power transfer sections and connections.

FIG. 10 is a schematic side view of an offshore wireless power transfer system with a primary interface (421) coupled with an offshore solar energy to electric energy converter (423). The primary interface (421) can be nonbuoyant supported by a bottom rest supporting construction (428) and can include power transfer sections with connections (not shown) [e.g. nonflexible mechanical connections, power connections, electrical connections, electronic connections, etc.].

Figure 11:
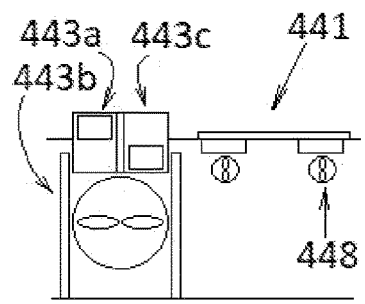
FIG. 11 is a schematic side view of an offshore wireless power transfer system with a primary interface coupled with an offshore wave energy to electric energy converter, an offshore water current energy to electric energy converter, and with an offshore tidal energy to electric energy converter. The primary interface can be buoyant anchored with dynamic anchoring and can include power transfer sections and connections.

FIG. 11 is a schematic side view of an offshore wireless power transfer system with a primary interface (441) coupled with an offshore wave energy to electric energy converter (443a), an offshore water current energy to electric energy converter (443b), and with an offshore tidal energy to electric energy converter (443c). The primary interface (441) can be buoyant anchored with dynamic anchoring (448) and can include power transfer sections with connections (not shown) [e.g. flexible mechanical connections, power connections, electrical connections, electronic connections, etc.].

Figure 12:
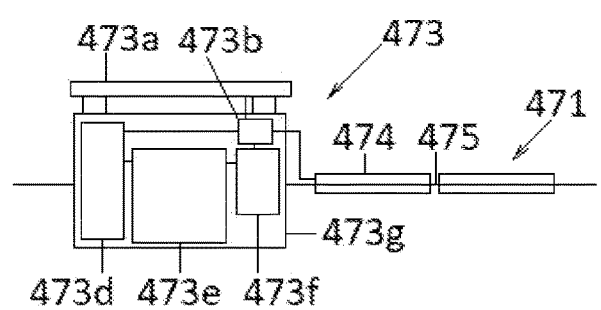
FIG. 12 is a schematic cross sectional view of an offshore wireless power transfer system with a primary interface coupled with offshore fuel cells and provided in a hydrogen powering system. The primary interface can be buoyant, can include power transfer sections with connections and can be moored to an unit containing the offshore fuel cells.

FIG. 12 is a schematic cross sectional view of an offshore wireless power transfer system with a primary interface (471) coupled with an offshore fuel cells unit (473) which can include a buoyant container (473g) [or a bottom rest supported construction]. The primary interface (471) can be buoyant, can include power transfer sections (474) with connections (475) and can be moored to the offshore fuel cells unit (473) which can include an array of solar cells (473a) and a hydrogen powering system which can comprise a hydrogen storage system (473e) [which can be a container (high pressurised, cryo-compressed, cryogenically liquefied, solid state physical storage/chemical storage) of various shapes and dimensions (e.g. cylindric, cubic) and from various materials (e.g. metals, composites, glass)] and a hydrogen production system (473d) [which can be an acidic, alkaline, solid oxide, photo, photo-electrochemical electrolysis systems, hydrocarbons reforming systems, alcohols reforming systems, sugars reforming systems, chemical processing systems, biological processing systems, biomass processing systems, thermal processing systems, photo processing systems, metal and water systems].

The hydrogen storage system (473e) can be coupled with a fuel cell (473f) which can use hydrogen to generate power which can be managed by a power flow controller (473b) to be used by the primary interface (471) to provide power to a water vessel at least partially electrically driven (not shown).

Figure 13:
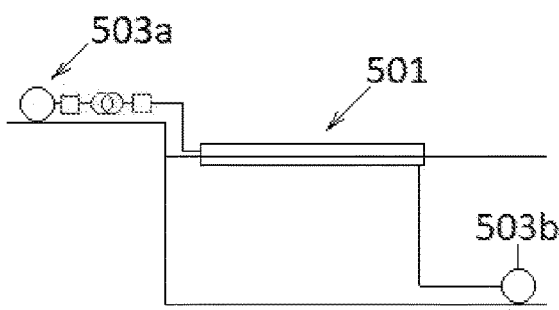
FIG. 13 is a schematic side view of an offshore wireless power transfer system with an onshore smart grid and with an offshore smart grid. The primary interface can be buoyant and can include power transfer sections and connections.

FIG. 13 is a schematic side view of an offshore wireless power transfer system with an onshore smart grid (503a) [which can comprise a substation] and with an offshore smart grid (503b). The primary interface (501) can be buoyant and can include power transfer sections with connections (not shown) [e.g. flexible mechanical connections, power connections, electrical connections, electronic connections, etc.].

Figure 14:
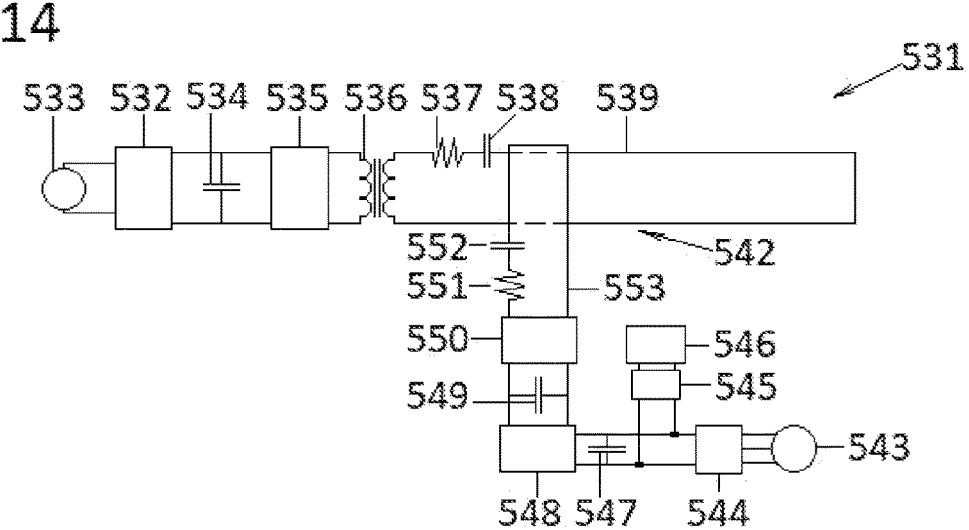
FIG. 14 is a schematic of an inductive offshore wireless power transfer system with primary and secondary inductive interfaces coupled with electrocomponents.

FIG. 14 is a schematic of an inductive offshore wireless power transfer system with a primary inductive interface (531) and a secondary inductive interface (542) coupled with electrocomponents. The primary inductive interface (531) can be coupled with a power source (533) which can be coupled with a converter (532) which can be coupled with a capacitor (534) which can be coupled with an inverter (535) which can be coupled with a transformer (536) which can be coupled with a resistance (537) which can be coupled with a capacitor (538) which can be coupled with a primary inductive loop (539). The primary inductive interface (531) can include power transfer sections with connections (not shown) [e.g. flexible mechanical connections, power connections, electrical connections, electronic connections, etc.].

The secondary inductive interface (542) can be coupled with an electric motor (543) [which can be an AC electric motor] which can be coupled with an inverter (544) which can be coupled with a converter (545) which can be coupled with a rechargeable power source (546) which can be coupled with a capacitor (547) which can be coupled with a voltage regulator (548) which can be coupled with a capacitor (549) which can be coupled with a rectifier (550) which can be coupled with a resistance (551) which can be coupled with a capacitor (552) which can be coupled with a secondary inductive loop (553).

Figure 15:
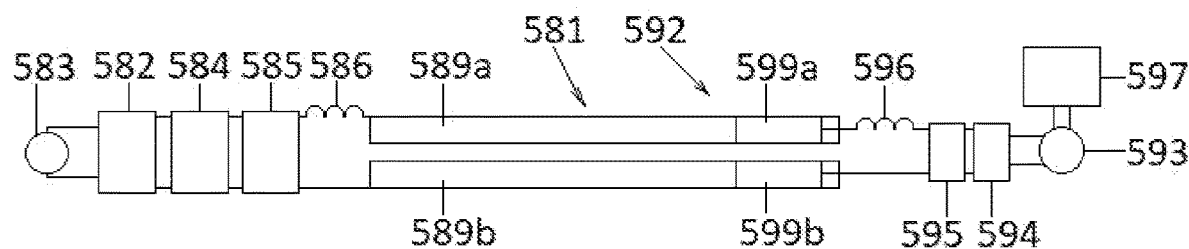
FIG. 15 is a schematic of a capacitive offshore wireless power transfer system with primary and secondary capacitive interfaces coupled with electrocomponents.

FIG. 15 is a schematic of a capacitive offshore wireless power transfer system with a primary capacitive interface (581) and a secondary capacitive interface (592) coupled with electrocomponents. The primary capacitive interface (581) can be coupled with a power source (583) which can be coupled with a power factor correction (582) which can be coupled with a voltage regulation (584) which can be coupled with an inverter (585) which can be coupled with a compensation (586) [which can be various topologies] which can be coupled with primary capacitive plates (589a, 589b). The primary capacitive interface (581) can include power transfer sections with connections (not shown) [e.g. mechanical connections, power connections, electrical connections, electronic connections, etc.].

The secondary capacitive interface (592) which can include secondary capacitive plates (599a, 599b) can be coupled with an electric motor (593) [which can be a DC electric motor] which can be coupled with a filter (594) which can be coupled with a rectifier (595) which can be coupled with a compensation (596) [which can be various topologies]. The electric motor (593) can be coupled with a rechargeable power source (597) [which can include a source management system].

Figure 16:
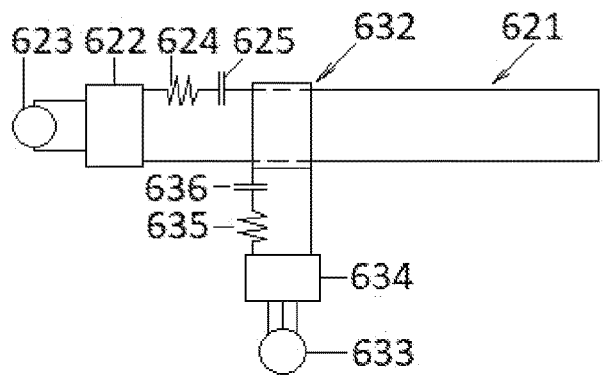
FIG. 16 is a schematic of a magnetodynamic offshore wireless power transfer system with primary and secondary magnetodynamic interfaces coupled with electrocomponents.

FIG. 16 is a schematic of a magnetodynamic offshore wireless power transfer system with a primary magnetodynamic interface (621) and a secondary magnetodynamic interface (632) coupled with electrocomponents. The primary magnetodynamic interface (621) [which can include a transmitting loop] can be coupled with a power source (623) which can be coupled with a primary power electronics (622) [which can include communication components] which can be coupled with a resistance (624) which can be coupled with a capacitor (625). The primary magnetodynamic interface (621) can include power transfer sections with connections (not shown) [e.g. mechanical connections, power connections, electrical connections, electronic connections, etc.].

The secondary magnetodynamic interface (632) [which can include a receiving loop, a piezoelectric transducer, an electrostatic transducer] can be coupled with an electric motor (633) which can be coupled with a secondary power electronics (634) [which can include communication components] which can be coupled with a resistance (635) which can be coupled with a capacitor (636). The primary magnetodynamic interface (621) and/or the secondary magnetodynamic interface (632) can include one or more loops [e.g. transmitting and receiving coils] magnetically acting [e.g. exciting into mechanical resonance] on a magnetic element to transfer power.

Common Features of FIGS. 14 to 16

The shown arrangements between the primary interfaces (531, 581, 621) and the secondary interfaces (542, 592, 632) can be used for static/dynamic charging/discharging in which later case the electrocomponents can be bidirectional. Various primary and secondary circuits using various electrocomponents in various topologies can be used.

Common Features of FIGS. 1 to 16

Offshore wireless power transfer systems (OPTSs) can comprise thermal management systems to thermally manage providing unidirectional and/or bidirectional energy flow using air tempering systems, liquid tempering systems and/or liquid tempering systems using offshore water as a thermal medium. The systems can use any convenient types of ventilators, thermal exchangers, compressors, chillers, condensers, heaters, sensors, pumps, valves, programmable controllers, thermal medium conducts, cooling plates, etc. The systems can thermally manage primary and/or secondary interfaces. The systems can thermally manage power cables coupling the primary interfaces to power sources and/or power cables coupling the secondary interfaces to water vessels at least partially electrically driven.

The (OPTSs) can provide wired/wireless data transmissions being in relation with unidirectional/bidirectional power transfer while water vessels at least partially electrically driven can be stationary and/or in a motion. The data transmissions can be local [e.g. via charging interfaces, local wired/wireless networks] and distant [e.g. via power cables coupling primary interfaces with power sources, via satellite connections, telephone techniques, etc.]. The data transmissions can include underwater acoustic techniques. The system can use any convenient type of communication interfaces, lines, techniques and protocols.

Figure 17:
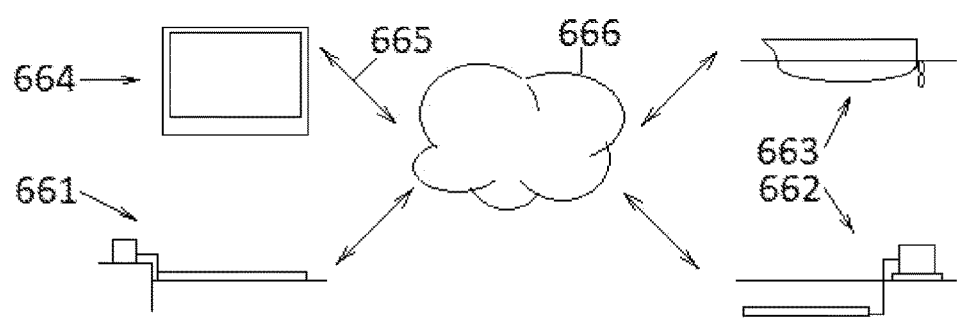
FIG. 17 is a schematic of an offshore wireless power transfer system provided in a cloud-based communication system comprising communication nodes.

FIG. 17 is a schematic of an offshore wireless power transfer system provided in a cloud-based communication system comprising communication nodes (661, 662, 663, 664) which can be an embodiment of an offshore power transfer system with a primary interface including power transfer sections and connections and coupled with an onshore power source wherein the power transfer can take place at about water level (661), another embodiment of the offshore power transfer system with a primary interface including power transfer sections and connections and coupled with an offshore power source wherein the power transfer can take place under water level (662), a water vessel at least partially electrically driven (663) and an operator (664). The communication nodes (661, 662, 663, 664) can be in wired and/or wireless communication (665) with a cloud (666) which can store their data. The operator (664) can via the cloud (666) operate the communication system. Each communication node (661, 662, 663, 664) and the cloud (666) can have a different operator.

Common Requirements

Offshore wireless power transfer systems (OPTSs) situated in seas or in oceans may be object of various tidal ranges varying from near zero to about 16 metres (53.5 feet) and averaging about 0.6 metres (2 feet) in the open ocean. In that case, level adjustable floats or level adjustable bottom rest supporting constructions may be designed to cope with a tidal range in selected areas for placement of the OPTSs.

The OPTS operated/temporarily operated under water level may provide atmospheric pressure in an inner space of its primary interface (e.g. filled with dry air, nitrogen, etc.) which may be advantageous for its electronic components or it may be kept at another pressure.

The OPTSs may further include further components enhancing their functionality such as installation spaces, connecting boxes, electricity meters, main switches, input/output terminals, fuse distributions, etc. The electronic control and communication elements may be housed in electromagnetically shielded spaces. All electrical and electronic equipment may be particularly protected against moisture, salt water and grid to prevent failure of power and electronic elements. External controls may be suitably adapted to function in offshore conditions. Subsea plugs, isolation bushings, cathodic protection and special resistive materials and anticorrosive surface treatments may be used.

Common requirements on offshore wireless power transfer systems in cold areas

The OPTSs may be situated offshore in the Arctic, the Antarctic, subpolar and cold seas. In that case, components of the OPTS may be designed to be conform with cold/extremely cold/temporarily cold conditions. Primary interfaces may be specifically designed to be posed/temporarily posed on a solid base (e.g. ice) and/or to be ice pressure/snow weight resistant. Coupling portions of the primary interfaces may be specially designed to ensure functionality in extreme conditions (e.g. to be protected against snowfall). The primary interfaces may require special anchoring/mooring systems. A special insulation of power cables (which may be posed on ice) may be provided. A special thermal insulation of primary interfaces, their components (e.g. electronic) and power sources may be provided. Special material solutions for components of the OPTS with regard to low temperatures may be provided (e.g. for the connections of the power transfer sections). A special design of single components (e.g. power transfer sections which may be posed/temporarily posed on ice/snow) may be required for the polar areas. Level adjustability may be provided by different means and constructions on ice than in offshore water. Seasonal/temporary system solutions which make use of ice as a support may be utilised. Thermal management systems of the OPTSs may require heating systems.

No limitations are intended others than as described in the claims. The present invention is not limited to the described exemplary embodiments. It should be noted that various modifications of the OPTS can be made without departing from the scope of the invention as defined by the claims.

The elements described in this specification and the used terminology reflect the state of knowledge at the time of the filling of this application and may be developed in the future.

INDUSTRIAL APPLICABILITY

The present invention may provide a static/dynamic offshore wireless power transfer system for water vessels at least partially electrically driven which may or may not include a rechargeable power source.

The OPTS may increase operational ranges of the water vessels, reduce the necessary on-board battery capacity and may relieve port traffic.

Hybrid water vessels with an engine burning hydrocarbon fuels may opt for the OPTS in port areas to reduce air pollution.

A dynamic offshore wireless power transfer can save time otherwise necessary for charging.

The OPTS providing a bidirectional power flow may help to improve a performance of a power grid at peak load times and bring economic benefits.

A level adjustability of primary interfaces may protect them in case of a malevolent attack, bad weather conditions and may avoid conflicts with sea transport and fishing.

The OPTS in a cloud-based communication system may bring efficiency, flexibility lower costs and lower $CO_2$ emissions of an OPTS management.

Hydrogen powering systems using renewable sources (arrays of solar cells, wind energy to electric energy converters, wave energy to electric energy converters, water currents energy to electric energy converters, tidal energy to electric energy converters) may provide a power reserve to be used for electricity production and supply by an OPTS (e.g. in peak load times) or may be a principal power source.

The proposed modularity may concern all elements of the OPTS cited in the claims and can bring functional and financial benefits to the parties. Modular designs may use various degrees of modularity [e.g. component slottability, platform systems, holistic approach, etc.]. Modules may be catalogued.

I claim:

1. An offshore wireless power transfer system for a water vessel at least partially electrically driven comprising a primary interface couplable or coupled with a power source, wherein at least one said power source is selected from the group consisting of onshore power sources, offshore power sources, arrays of solar cells, fuel cells, wind energy to electric energy converters, wave energy to electric energy converters, water currents energy to electric energy converters, tidal energy to electric energy converters, motor generators, smart grids, or combinations thereof, a secondary interface couplable or coupled with said water vessel at least partially electrically driven, wherein said primary and said secondary interfaces are configured to provide an unidirectional and/or bidirectional energy flow while said water vessel at least partially electrically driven be stationary and/or in a motion, characterized in that said primary interface includes one or more power transfer sections; one or more connections to couple said one or more power transfer sections and designed to cope with an offshore agent wherein at least one said offshore agent is selected from the group consisting of wave movements, tidal changes, water currents, or combinations thereof and wherein at least one said connection is selected from the group consisting of mechanical connections, hydraulic connections, electromagnetic connections, pneumatic connections, power connections, electrical connections, electronic connections, flexible connections, nonflexible connections, or combinations thereof.

2. The offshore wireless power transfer system according to claim 1, wherein at least one said power transfer system is selected from the group consisting of inductive power transfer systems, capacitive power transfer systems, magnetodynamic power transfer systems, or combinations thereof.

3. The offshore wireless power transfer system according to claim 1, wherein said power transfer sections are switchable.

4. The offshore wireless power transfer system according to claim 1, wherein said primary interface is defined as a primary inductive interface including one or more primary inductive loops, and wherein said secondary interface is defined as a secondary inductive interface including one or more secondary inductive loops, and wherein said primary inductive loops and said secondary inductive loops are disposed in simple or multiple primary inductive interfaces and simple or multiple secondary inductive interfaces, respectively.

5. The offshore wireless power transfer system according to claim 1, wherein said primary interface is defined as a primary capacitive interface including at least one pair of primary capacitive plates, and wherein said secondary interface is defined as a secondary capacitive interface including at least one pair of secondary capacitive plates, and wherein said primary capacitive plates and said secondary capacitive plates are disposed in simple or multiple primary capacitive interfaces and simple or multiple secondary capacitive interfaces, respectively.

6. The offshore wireless power transfer system according to claim 1, further comprising: one or more magnetic elements, wherein said primary interface is defined as a primary magnetodynamic interface, and wherein said secondary interface is defined as a secondary magnetodynamic interface, and wherein at least one of said primary and said secondary magnetodynamic interface include one or more loops magnetically acting upon said one or more magnetic elements to transfer power, and wherein said one or more loops and/or said one or more magnetic elements are disposed in simple or multiple primary magnetodynamic interfaces and/or simple or multiple secondary magnetodynamic interfaces, respectively.

7. The offshore wireless power transfer system according to claim 1, further comprising: a thermal management system to thermally manage providing said unidirectional and/or bidirectional energy flow, wherein at least one said thermal management system is selected from the group consisting of air tempering systems, liquid tempering systems, liquid tempering systems using offshore water as a thermal medium, or combinations thereof.

8. The offshore wireless power transfer system according to claim 1, wherein said primary interface is buoyant or nonbuoyant supported by a bottom rest supporting construction, and/or wherein said secondary interface is buoyant or nonbuoyant supported by a water vessel supporting construction.

9. The offshore wireless power transfer system according to claim 1, wherein said primary and/or said secondary interfaces are at least partially level adjustable.

10. The offshore wireless power transfer system according to claim 1, wherein said secondary interface is mobile and/or coupled with a mobile device providing said secondary interface with a mobility, and/or wherein said secondary interface is arranged to be at least partially rotational.

11. The offshore wireless power transfer system according to claim 1, wherein at least one of said primary and said secondary interface include or is coupled with an electrocomponent, wherein at least one said electrocomponent is selected from the group consisting of sensors, targets, actuators, amplifiers, resonators, rectifiers, filters, inverters, converters, transformers, voltage regulators, power factor corrections, compensations, power electronics, controllers, processors, inductors, capacitors, resistors, diodes, varactors, switches, conductors, rechargeable power sources, source management systems, electric motors, or combinations thereof.

12. The offshore wireless power transfer system according to claim 1, wherein it provides at least one data transmission selected from the group consisting of wired data transmissions, wireless data transmissions, or combinations thereof, wherein said data transmission is in relation with providing said unidirectional and/or bidirectional energy flow while said water vessel at least partially electrically driven be stationary and/or in said motion.

13. The offshore wireless power transfer system according to claim 1, wherein said wireless power transfer system is provided as part of a cloud-based communication system, characterised in that it comprises: one or more communication nodes, wherein at least one said communication node is selected from the group consisting of operators, said offshore wireless power transfer systems, said water vessels at least partially electrically driven, or combinations thereof; a cloud, wherein said communication node is in wired and/or wireless communication with said cloud.

14. The offshore wireless power transfer system according to claim 1, wherein said offshore wireless power transfer system is provided as part of a hydrogen powering system, characterised in that it comprises: a hydrogen production system to produce hydrogen in a functional connection with said offshore wireless power transfer system, wherein at least one said hydrogen production system is selected from the group consisting of electrolysis systems, hydrocarbons reforming systems, alcohols reforming systems, sugars reforming systems, chemical processing systems, biological processing systems, biomass processing systems, thermal processing systems, photo processing systems, metal and water systems, or combinations thereof; a hydrogen storage system to store at least partially hydrogen produced by said hydrogen production system, wherein at least one said hydrogen storage system is selected from the group consisting of compressed gas systems, liquified gas systems, chemical systems, electrochemical systems, physi-sorption systems, nanomaterial systems, intercallation in metals systems, intercallation in hydrides systems, inorganic gaseous systems, inorganic liquids systems, inorganic solids systems, organic gaseous systems, organic liquids systems, organic solids systems, or combinations thereof.

15. The offshore wireless power transfer system according to claim 1, wherein said offshore wireless power transfer system is provided as part of a modular system, characterised in that it comprises: a module, wherein at least one said module is selected from the group consisting of said primary interfaces, said arrays of solar cells, said fuel cells, said wind energy to electric energy converters, said wave energy to electric energy converters, said water currents energy to electric energy converters, said tidal energy to electric energy converters, said motor generators, said secondary interfaces, inductive power transfer systems, capacitive power transfer systems, magnetodynamic power transfer systems, power transfer sections, mechanical connections, hydraulic connections, electromagnetic connections, pneumatic connections, power connections, electrical connections, electronic connections, flexible connections, nonflexible connections, bottom rest supporting constructions, water vessel supporting constructions, mobile devices, electrocomponents, hydrogen production systems, hydrogen storage systems, or combinations thereof, wherein said module is modularly scalable and/or exchangeable and/or couplable with at least one element of said offshore wireless power transfer system.

* * * * *